March 11, 1930.  E. W. PRIGAN  1,750,023
AUTOMATIC CHUCK
Filed May 4, 1925
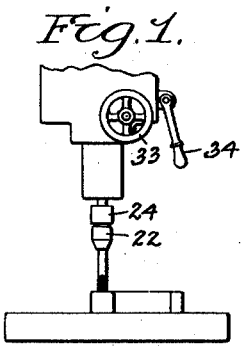
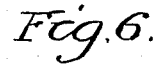
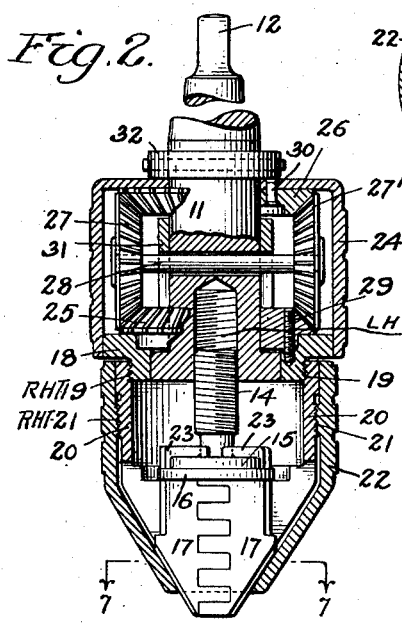
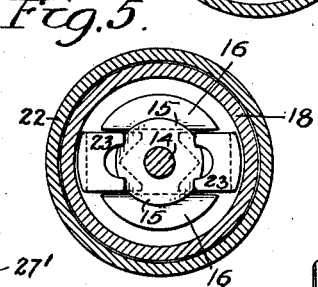
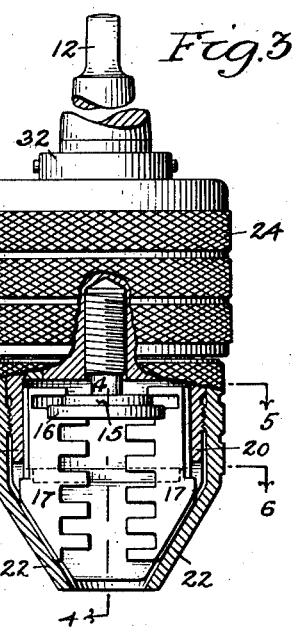
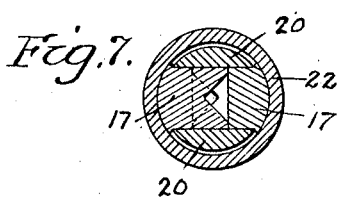
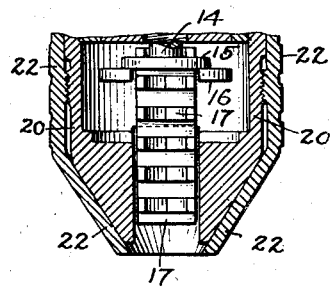
INVENTOR
ERNEST W. PRIGAN
BY Frank L. A. Graham
ATTORNEY Patented Mar. 11, 1930

1,750,023

UNITED STATES PATENT OFFICE

ERNEST W. PRIGAN, OF CAMP BALDY, CALIFORNIA, ASSIGNOR TO ALBERT LEE SHEPARD, OF LOS ANGELES, CALIFORNIA

AUTOMATIC CHUCK

Application filed May 4, 1925. Serial No. 27,765.

My present invention being referred to as an automatic chuck, it may be understood to be an object of this invention to provide a self-centering chuck especially suitable for use on an ordinary vertical drill press, or the like; but it should be understood that the axis of rotation of my chuck need not be vertical, and that my chuck may be employed in holding either a tool which operates by rotation or work to be rotated relatively to a fixed or moving tool.

It is an especial object of this invention to provide a chuck with means whereby it may be opened and closed without a wrench; and, in a preferred embodiment, the spindle of my chuck being continuously rotated, and the operating parts of the same being housed in a pair of concentric but separate cylindrical bodies adapted to be gripped alternatively or at will by the hand of an operative, the construction of my chuck may be such that the mere stoppage or relative retardation of one of the mentioned housings or body sections, as the upper section thereof, may be effective to open the jaws of the chuck, the stoppage or retardation of the other housing or body section being effective to produce an opposite effect.

It is an object of this invention to provide a chuck equipped with means whereby it may conveniently be manually opened and closed even during the continuous rotation of the spindle thereof; and a preferred embodiment of my invention may comprise a spindle extending through an intermediate plate disposed between the mentioned housing sections, said spindle being interiorly threaded at its lower end to receive the threaded stem of a jaw retractor. This jaw retractor, although movable longitudinally of the axis of rotation of my chuck, may be rotatable in opposite directions by means of the mentioned cylindrical housings or body sections; and, to this end, it may be provided not only with a jaw-engaging head, but with interlocking extensions preventing relative rotation between said head and the mentioned jaws,—the latter being in turn held against rotation relatively to the lowermost cylindrical body section, as by the interposition of a suitable guide body rotatable therewith.

It is a further object of this invention to provide a chuck with a pair of manually engageable but normally rotating control collars, one of these being what I may term a locking collar, and the other a releasing collar, both of said collars being preferably disposed concentrically of the axis of rotation of said chuck, and the releasing collar being preferably larger in diameter and adapted to house a gearing by which the locking collar, and a guide body for chuck jaws, and the jaw retractor carried therein may all be given a relative rotation such as to effect the retraction of said jaws.

Other objects of my invention will appear from the following description of an advantageous embodiment thereof, taken in connection with the appended claims and the accompanying drawings, in which Fig. 1 is a general elevational view showing one relationship in which my chuck may advantageously be used, in a vertical drill press.

Fig. 2 is a substantially median section through a chuck illustrating my invention, with parts broken away, and with the chuck jaws in their advanced or closed position.

Fig. 3 is a view similar to Fig. 2, but showing in section only the lower portion of a chuck, with the jaws of the same in a retracted position.

Fig. 4 is a sectional view, corresponding to the lower portion of Fig. 3, but taken in the plane indicated by the line 4—4 of Fig. 3.

Figs. 5 and 6 are transverse sectional views taken substantially as indicated by the lines 5—5 and 6—6 of Fig. 3.

Fig. 7 is a transverse sectional view, taken substantially as indicated by the line 7—7 of Fig. 2.

Referring to the details of that specific embodiment of my invention chosen for purposes of illustration, 11 being the spindle of a chuck whose upper or inner end may be tapered and laterally reduced, as at 12, in a manner favorable to its easy insertion and secure retention within any organization adapted to rotate the same, the lower end of this spindle may be provided, as at LHT13, with an interior thread adapted to engage a corresponding thread upon a pin 14 of a suitable jaw retractor, as, for example, a jaw retractor comprising a jaw-engaging head 15 and interlocking extensions 16,—the latter being adapted to overlie the respective sides of jaws 17, for the gripping of a drill or other tool or work to be rotated.

Surrounding the lower end of the spindle 11, or its equivalent, I may provide an intermediate plate 18, to which I may secure, as by means of threads RHT19, (inclined oppositely to the mentioned thread LHT13) a guide body 20, cylindrical in its upper portion, but conically formed and transversely slotted at its lower or outer end, in such manner as to prevent relative rotation of the jaws 17, or their equivalents. Over the mentioned guide body and about the described parts assembled therein, I may secure, as by means of threads RHT21, corresponding in the general direction of their inclination to the threads RHT19, but optionally of a different pitch, a cylindrical body section 22, adapted to serve as a housing for the mentioned operating parts and adapted to serve also as a manually engageable control collar, the lower portion of this element being interiorly conical in such manner as to afford additional guide means, cooperating with the guide body 20 in assuring a proper centering of the jaws 17, during their retraction or advance,—the jaws 17 being shown (see Fig. 7) as provided with side flanges, slidable in spaces provided between the collar 22 and the guide 20 during the radial reciprocation of said jaws. In case the spindle 11 is to be given a right-hand rotation, as in ordinary drilling operations, the thread LHT13, engaging the jaw retractor comprising pin 14 and head 15, (always extending beneath retaining projections 23 upon the upper ends of the jaws 17) may advantageously be a left-hand thread; and, in this case, the threads RHT19 and RHT21, should be right-hand threads, in order that the manipulation of the housing or control collar 22, with a view to the closing of the jaws 17, shall be without effect upon the relationships between the enclosing and guiding members referred to. That is to say, assuming the spindle 11 to be continuously rotated in a right-hand direction, it is intended that the mere stoppage or retardation of the control collar 22 shall be effective to close the jaws 17, although producing no relative movement between the elements 18, 20 and 22.

One of the outstanding features of my invention is the provision of means whereby, also without discontinuing the rotation of the spindle 11, the mere gripping of a second control collar or housing, such as the collar or housing 24, whose lower or outer end extends over and may rotate relatively to the intermediate plate 18, may be effective in opening the jaws of my chuck; and, for the purpose just referred to, I may employ means such as a suitable reversing gear system comprised within the control collar or housing 24. Not only to provide adequate leverage in the releasing of a drill, or the like, from the jaws 17, but to provide adequate room for the reversing means therein, the housing or control collar 24 may advantageously be of a slightly greater diameter than the housing or control collar 22, as shown; and the mentioned reversing mechanism may advantageously comprise gears 25 and 26, similar, except as the gear 25 is adapted to engage a head or expansion on the lower end of the spindle 11, these gears 25 and 26 being respectively secured to the upper inner surface of the intermediate plate 18 and to the opposite interior surface of the housing or collar 24. Opposite relative rotation of these gears may be effected by means such as a pair of intermediate or transmission gears 27, 27' mounted upon the ends of a transverse pin 28, extending through the spindle 11 in such manner that, whenever the said spindle is rotated in the manner described, if the housing or control collar is momentarily held stationary, as by the hand of an operative, the intermediate plate 18, and thereby the jaw retractor comprising pin 14, are immediately compelled to rotate in the same direction as the spindle 11, but at a higher speed, the effect being a prompt release of any tool held between the jaws 17. The respective gears 25 and 26 may be secured in place by any suitable means, as by screws 29 or rivets or pins 30; and means such as a slotted interior spacing collar 31, and a pinned exterior retaining collar 32 may be employed to hold the mentioned parts in their assembled relationships, although permitting ready access thereto for purposes of inspection, replacement or repair.

In the use of my automatic chuck, as will be understood from the foregoing description, the positioning and control of the spindle 11 being effected by usual means, such as a hand wheel 33 and a lever 34, Fig. 1, an operative may open the jaws of his chuck by simply engaging the collar or housing 24, closing the same, after releasing the mentioned collar, by grasping the collar or housing 22; and these operations may be repeated at will, without loss of time incidental to the finding and manipulation of a wrench, as required in the opening and closing of chucks in current use, the result being a substantial increase in the amount of work done by each installation and by each operative within any given interval of time.

Although I have herein described a single complete embodiment of my invention, I am aware that various features of my invention might be independently used and that various changes and modifications might be made by those skilled in the art to which this case relates, without the slightest departure from the spirit and scope of my invention, as the same is indicated above and in the following claims.

I claim as my invention:

1. A chuck comprising: a spindle adapted to be constantly rotated; a threaded pin interiorly engaging said spindle and provided with a head plate having laterally extending segmental, annular jaw engaging extensions; jaws adapted to rotate with said spindle and provided with inwardly extending head engaging projections; and control means, including separate control elements, also normally rotating with said spindle, and interior parts including gears associated with said control elements and said threaded pin, for effecting opening and closing movements of said jaws during a relative retardation of the respective control elements.

2. A chuck embodying: a spindle adapted to be constantly rotated; a threaded pin adapted to be received in said spindle; a head plate on the extending end of said threaded pin; jaws associated with said head plate and adapted to receive positive lateral movement during relative rotation between said threaded pin and said spindle; and means for controlling the movement of said jaws during the rotation of said spindle comprising a guide body provided with recesses adapted to slidably receive said jaws, an intermediate plate mounted on said guide body, a gear on said intermediate plate, a control collar rotatable relative to said intermediate plate, a gear on said control collar, and transmission gears rotatable by said spindle interposed between the gears on said collar and said intermediate plate.

In testimony whereof, I have hereunto set my hand at Los Angeles, California, this 23rd day of March, 1925.

ERNEST W. PRIGAN.